(12) United States Patent
Wang et al.

(10) Patent No.: US 12,121,837 B2
(45) Date of Patent: *Oct. 22, 2024

(54) METHOD FOR RECYCLING SCRAPPED POLYVINYLIDENE FLUORIDE (PVDF) MEMBRANE PRODUCED IN WATER TREATMENT

(71) Applicant: Tongji University, Shanghai (CN)

(72) Inventors: Zhiwei Wang, Shanghai (CN); Chenxin Tian, Shanghai (CN); Ruobin Dai, Shanghai (CN); Tianlin Wang, Shanghai (CN); Jiansuxuan Chen, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 745 days.

This patent is subject to a terminal disclaimer.

(21) Appl. No.: 17/322,944

(22) Filed: May 18, 2021

(65) Prior Publication Data
US 2022/0297036 A1    Sep. 22, 2022

(30) Foreign Application Priority Data
Mar. 17, 2021 (CN) .......................... 202110284052.6

(51) Int. Cl.
*B01D 41/00* (2006.01)
*B08B 3/04* (2006.01)
*B08B 7/00* (2006.01)

(52) U.S. Cl.
CPC .............. *B01D 41/00* (2013.01); *B08B 3/044* (2013.01); *B08B 7/0071* (2013.01)

(58) Field of Classification Search
CPC .... B01D 41/00; B01D 41/04; B01D 39/1692; B01D 65/02; B01D 65/025; B01D 65/108; B01D 65/06; B01D 65/10; B01D 67/0088; B01D 67/00931; B01D 2321/168; B01D 2239/0421; C02F 1/44; B08B 3/044; B08B 3/04; B08B 7/0071; B08B 7/00; Y02W 10/10; Y02W 30/62

USPC .................................... 210/791, 636, 500.27
See application file for complete search history.

(56) References Cited

U.S. PATENT DOCUMENTS

| | | | |
|---|---|---|---|
| 2012/0168370 A1* | 7/2012 | Aoki ................ | B01D 67/00931 210/500.27 |
| 2014/0054221 A1* | 2/2014 | Agnihotri .......... | B01D 67/0088 210/636 |

* cited by examiner

*Primary Examiner* — Akash K Varma
(74) *Attorney, Agent, or Firm* — Bayramoglu Law Offices LLC

(57) ABSTRACT

A method for recycling a scrapped polyvinylidene fluoride (PVDF) membrane through chemical cleaning-structural transformation-hydrophilicity is disclosed, which can extend the service life of scrapped PVDF membrane materials (namely, membrane at the end of service life). The method includes the following steps: cleaning a scrapped membrane with sodium hypochlorite and citric acid; treating the membrane with a structural transformation agent, where irreversible contaminants are washed away while the PVDF membrane is subjected to pore expansion and hydrophilization; and with self-polymerization of dopamine on a membrane surface, further improving the hydrophilicity of the membrane surface, enhancing the anti-contamination performance, and repairing damaged points on the surface of the scrapped PVDF membrane produced during long-term operation.

10 Claims, 3 Drawing Sheets

METHOD FOR RECYCLING SCRAPPED POLYVINYLIDENE FLUORIDE (PVDF) MEMBRANE PRODUCED IN WATER TREATMENT

CROSS REFERENCE TO THE RELATED APPLICATIONS

This application is based upon and claims priority to Chinese Patent Application No. 202110284052.6, filed on Mar. 17, 2021, the entire contents of which are incorporated herein by reference.

TECHNICAL FIELD

The present invention, belongs to the technical field of separation membranes for water treatment, and specifically relates to a method for recycling a scrapped polyvinylidene fluoride (PVDF) membrane produced in water treatment.

BACKGROUND

PVDF microfiltration (MF)/ultrafiltration (UF) membranes are widely used in the field of water treatment, for example, in membrane bioreactors (MBRs) for wastewater treatment. In use of PVDF membranes, due to the presence of colloids and microorganisms in water, membrane contamination will inevitably occur, so membrane modules must be cleaned periodically. Although they have high chemical stability, PVDF membranes will still deteriorate in surface properties after long-term cleaning, for example, becoming more hydrophobic. This greatly shortens a contamination-cleaning cycle and increases the overall maintenance cost. Moreover, the overall membrane flux of a membrane decreases gradually during long-term contamination-cleaning cycles due to the irreversible contaminants in membrane contamination. When the membrane flux is reduced to a relatively low level, the membrane cannot meet the requirements of engineering water production and can hardly be restored by cleaning. In this case, the membrane will reach the end of its service life (generally 5 to 8 years). Conventionally, the membrane is scrapped and replaced with a new membrane. This is not only a huge economic burden on enterprises but also can cause a heavy burden on the environment.

The membrane scrap is essentially manifested in the following two cases: (1) the membrane flux is too low to be restored through conventional treatment; and (2) the membrane surface has poor hydrophilicity, leading to a short contamination-cleaning cycle. If the above two problems can be solved, any membrane nearing the end of its service life can still be used after proper treatment, thereby prolonging the service life of the membrane.

SUMMARY

In view of the above-mentioned defects, the present invention provides a method for recycling a scrapped PVDF membrane produced in water treatment, such that the recycled membrane have a water flux restored to a level close to that of a new membrane and also have improved anti-contamination performance, thereby realizing the reuse of the scrapped PVDF membrane produced in water treatment.

The present invention provides the following technical solutions: a method for recycling a scrapped PVDF membrane produced in water treatment, including the following steps:

1) cleaning of the scrapped PVDF membrane: soaking the scrapped PVDF membrane in 0.2 wt % to 1.0 wt % sodium hypochlorite for 0.5 h to 4 h and then in 0.5 wt % to 4.0 wt % citric acid for 0.5 h to 4 h to remove mud cakes attached to a surface of the membrane; and rinsing the membrane with deionized water for subsequent processing;

2) structural transformation of the scrapped PVDF membrane: soaking the PVDF membrane treated in step 1) in a structural transformation agent at 10° C. to 40° C. for 0.5 min to 4.0 min, where, irreversible contaminants are washed away while the scrapped PVDF membrane is subjected to pore expansion and hydrophilization; and thorough rinsing the membrane with deionized water to remove superficial residual agents;

3) hydrophilicity repairing of the scrapped PVDF membrane: dissolving dopamine in a 15 mM Tris-HCl buffer aqueous solution to obtain a dopamine solution with a concentration of 0.4 mg/mL to 4 mg/mL, soaking the membrane in the dopamine solution under heating and shaking, where, a polydopamine (PDA) hydrophilic layer is formed through self-polymerization of dopamine on a membrane surface, which further improves the hydrophilicity of the membrane surface, enhances the anti-contamination performance, and repairs damaged points on the surface of the scrapped PVDF membrane produced during long-term operation; and after the processing, rinsing the membrane with running deionized water to remove weakly-bound PDA.

Further, the scrapped PVDF membrane has a membrane flux low than 30 L/(m²h bar), cannot meet requirements of engineering water production, and can hardly be restored by cleaning.

Further, the scrapped PVDF membrane has been used for 5 to 8 years.

Further, the scrapped PVDF membrane is in the form of a flat membrane, a hollow fiber membrane, or a spiral wound membrane.

Further, the structural transformation agent in step 2) is a mixed solution of N-methyl pyrrolidone (NMP), dimethylacetamide (DMAC), and methanol prepared in a volume ratio of (10-60):(10-60):30.

Further, the structural transformation agent in step 2) is repeatedly used 5 to 8 times.

Further, the Tris-HCl buffer aqueous solution in step 3) has a pH of 8.8.

Further, in step 3), the shaking in the shaker is conducted at a rotational speed of 50 rpm to 150 rpm.

Further, in step 3), the membrane is added to the dopamine solution at a heating temperature of 10° C. to 40° C.

Further, in step 3), the shaking for hydrophilicity repairing in the shaker is conducted for 2 h to 8 h.

The present invention has the following advantages.

1. The method for recycling a scrapped PVDF membrane produced in water treatment provided by the present invention is based on the idea of sustainable utilization of membrane materials, and the technology for recycling scrapped PVDF membranes through chemical cleaning-structural transformation-hydrophilicity repairing is proposed for the first time. The cleaning is conducted to wash away most of the contaminants on the surface of the scrapped PVDF membrane, thus facilitating the subsequent structural transformation of the membranes. Considering that irreversible contaminants blocking the pores in the long-term use of PVDF membranes are difficult to wash away by traditional chemical cleaning methods, and the membranes will become dense and hydrophobic due to long-term operation and cleaning, the structural transformation based organic solvents is adopted in step 2). The irreversible contaminants are washed away while the PVDF membrane is subjected to pore expansion and hydrophilization. The hydrophilicity repairing in step 3) is conducted to further improve the hydrophilicity of a membrane surface and the anti-contamination performance and repair damaged points on the surface of the scrapped PVDF membrane produced during long-term operation, thus ensuring the rejection effect of recycled PVDF membranes to contaminants in wastewater.

2. The new method provides a new disposal method for scrapped PVDF membranes produced in water treatment, which prolongs the service life of membranes and further promotes the resource recycling.

3. The method for recycling a scrapped PVDF membrane produced in water treatment provided in the present invention can achieve the repair and reuse of scrapped PVDF membranes by soaking the membranes in solutions in sequence, which involves simple operations and can be directly implemented at a project site without returning a membrane module to a factory.

4. The method for recycling a scrapped PVDF membrane produced in water treatment provided in the present invention can directly avoid the disposal cost of scrapped PVDF membranes for enterprises, save the investment and use costs of membranes for enterprises, and significantly ease the environmental burden caused by the disposal of scrapped PVDF membranes.

5. The structural transformation agent used in step 2) of the method for recycling a scrapped PVDF membrane produced in water treatment provided in the present invention can be repeatedly used 5 to 8 times, with a high utilization rate, which effectively reduces the cost of recycling scrapped PVDF membranes produced in water treatment.

BRIEF DESCRIPTION OF THE DRAWINGS

The present invention will be described in more detail below with reference to the examples and the drawings. Particularly.

DETAILED DESCRIPTION OF THE EMBODIMENTS

Figure 1A:
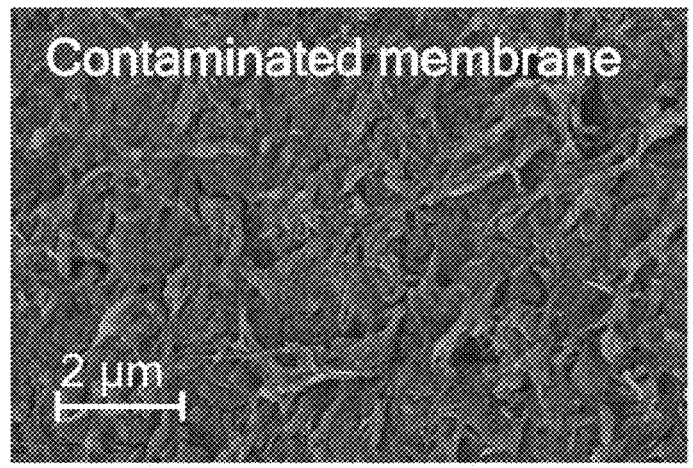
FIG. 1A shows a scanning electron microscopy (SEM) image of a scrapped PVDF membrane (a scrapped membrane)
Figure 1B:
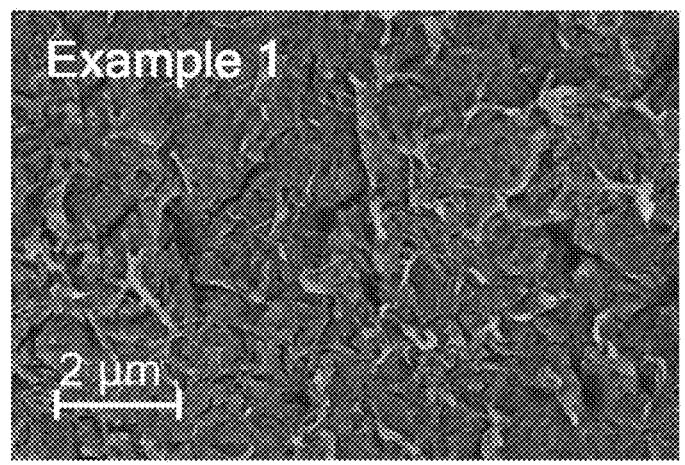
FIG. 1B shows an SEM image of the recycled PVDF membrane of Example 1 of the present invention.
Figure 1C:
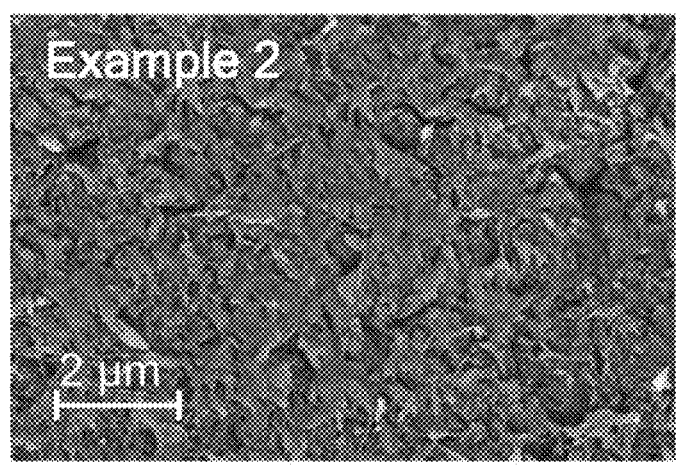
FIG. 1C shows an SEM image of the recycled PVDF membrane of Example 2 of the present invention.
Figure 1D:
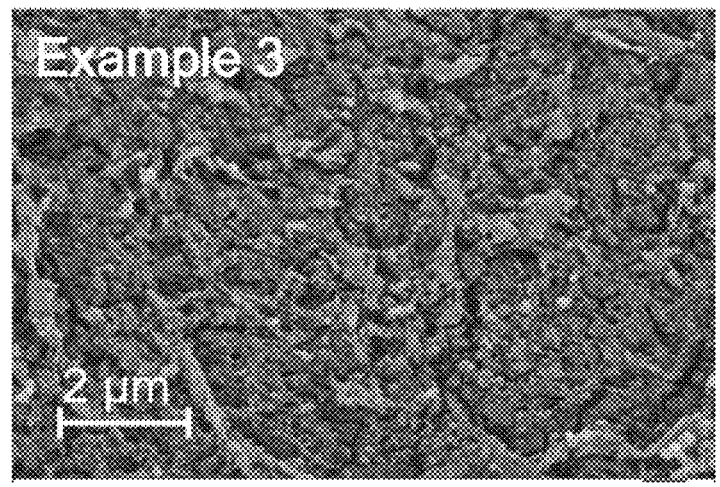
FIG. 1D shows an SEM image of the recycled PVDF membrane of Example 3 of the present invention.

The technical solutions in the examples of the present invention are clearly and completely described below with reference to the accompanying drawings in the examples of the present invention. The described examples are merely a part rather than all of the examples of the present invention. All other examples obtained by an ordinary skilled in the art based on the examples of the present invention without creative efforts shall fall within the protection scope of the present invention.

The present invention provides a method for recycling a scrapped PVDF membrane produced in ater treatment, including the following steps:

1) cleaning of the scrapped PVDF membrane: the scrapped PVDF membrane is soaked in 0.2 wt % to 1.0 wt % sodium hypochlorite for 0.5 h to 4 h and then in 0.5 wt % to 4.0 wt % citric acid for 0.5 h to 4 h to remove mud cakes attached to a surface of the membrane; and the membrane is rinsed with deionized water for later use;

2) structural transformation of the scrapped PVDF membrane: the PVDF membrane treated in step 1) is soaked in a structural transformation agent at 10° C. to 40° C. for 0.5 min to 4.0 min, where, the structural transformation agent is a mixed solution of NMP, DMAC, and methanol prepared in a volume ratio of (10-60):(10-60):30, and irreversible contaminants are away while the scrapped PVDF membrane is subjected to pore expansion and hydrophilization; and the membrane is thoroughly rinsed with deionized water to remove superficial residual agents; and 3) hydrophilicity repairing of the scrapped PVDF membrane: dopamine is dissolved in a 15 mM Tris-HCl buffer aqueous solution with pH 8.8 to obtain a dopamine solution with a concentration of 0.4 mg/mL to 4 mg/mL, the membrane is soaked in the dopamine solution at a heating temperature of 10° C. to 40° C., and shaken at 50 rpm to 150 rpm for 2 h to 8 h in a shaker, where, a PDA hydrophilic layer is formed through self-polymerization of dopamine on a membrane surface, which further improves the hydrophilicity of the membrane surface, enhances the anti-contamination performance, and repairs damaged points on the surface of the scrapped PVDF membrane produced during long-term operation; and after the reaction is completed, the membrane is rinsed, with running deionized water to remove weakly-bound PDA.

The structural transformation agent in step 2) is repeatedly used 5 to 8 times.

The scrapped PVDF membrane has a membrane flux lower than 30 L/(m$^2$h bar), cannot meet requirements of engineering water production, and can hardly be restored by cleaning. The scrapped PVDF membrane used has been used for 3 to 5 years, and a scrapped PVDF membrane is in the form of a flat membrane, a hollow fiber membrane, or a spiral wound membrane.

The concentrations of sodium hypochlorite and citric acid, the soaking temperature and time of the treated scrapped PVDF membrane in the structural transformation agent, the concentration of the dopamine solution for hydrophilicity repairing, and the time and shaking speed of the shaker for the hydrophilicity repairing can be adjusted according to the membrane properties such as membrane flux of a repaired and recycled PVDF membrane to be finally obtained.

Example 1

Cleaning of the scrapped PVDF membrane: the scrapped membrane is soaked in 0.5% sodium hypochlorite for 2 h and then in 1.5% citric acid for 2 h, and then rinsed with deionized water to remove excess agents on the surface.

The SEM images, in FIGS. 1A-D show that after the cleaning, large fouling layer attached to the surface fall off from the surface of the membrane.

Example 2

Structural transformation of the scrapped PVDF membrane: the treated PVDF membrane is soaked in a mixed solution of NMP DMAC, and methanol in a volume ratio of 60:10:30 at 30° C. for 2.0 min, and then thoroughly rinsed with deionized water to remove superficial residual agents.

The SEM images in FIGS. 1A-D show that contaminants on the membrane surface are further removed and the membrane structure is partially opened.

Example 3

Hydrophilicity repairing of the scrapped PVDF membrane: dopamine is dissolved in 15 mM Tris-HCl buffer aqueous solution (pH=8.8) to obtain a dopamine solution (2 mg/mL); the membrane is soaked in the dopamine solution at 30° C., and a resulting mixture is shaken in a shaker at 100 rpm for 8 h; and after the reaction is completed, the membrane is rinsed with running deionized water to remove weakly-bound PDA.

The SEM images in FIGS. 1A-D show that a uniform and dense PDA hydrophilic layer is formed on the surface of the membrane.

Test Example 1

Figure 2:
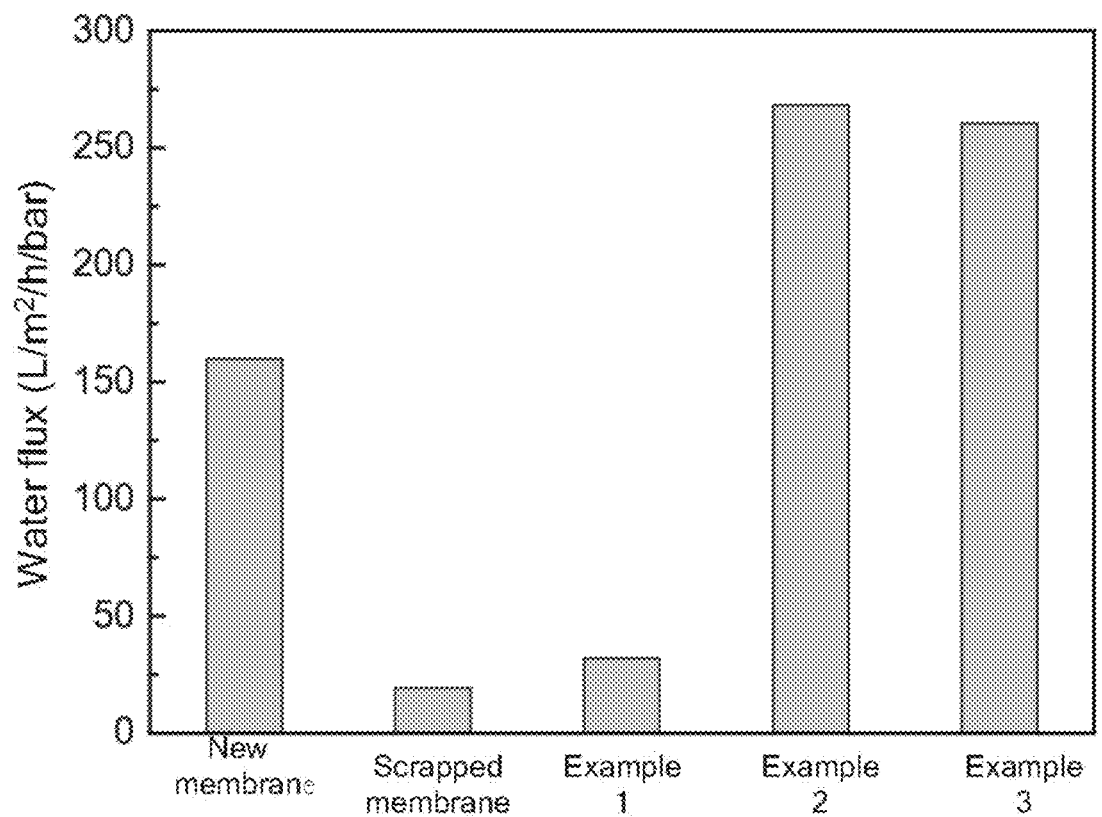
FIG. 2 is a comparison diagram illustrating the water fluxes of a new membrane, a scrapped PVDF membrane (a scrapped membrane), and recycled PVDF membranes of Examples 1 to 3 of the present invention.
Figure 3:
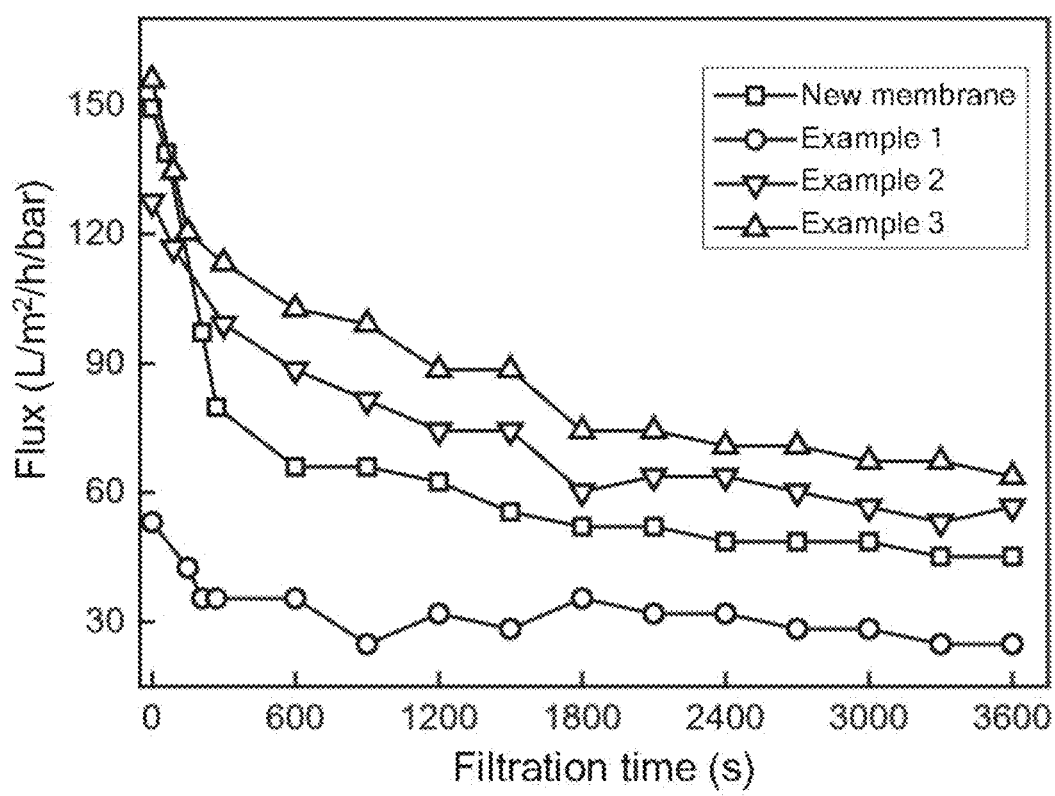
FIG. 3 is a comparison diagram illustrating the anti-fouling curves of a new membrane and recycled PVDF membranes of Examples 1 to 3 of the present invention.

Laboratory performance test of recycled membranes: A membrane module is connected with a flexible hose with a matching size and a reducing straight hose to assemble into a small membrane module suitable for performance test. The module is placed in a beaker with a given solution. The upper end is connected to a vacuum gauge and a peristaltic pump, and the constant-pressure suction method is used for test (at a constant pressure of 70 kPa). A balance is used to monitor the water mass in real time, and a water flux can be obtained according to a mass change. Bovine serum albumin (BSA) is added to the inlet water at a concentration of 0.5 g/L, and the change in membrane flux is measured to obtain an anti-fouling curve of the membrane. As tested, the new membrane, the scrapped membrane, and the membranes prepared in Examples 1 to 3 have water fluxes (FIG. 2) of 159.8 L/($m^2$h bar), 19.5 L/($m^2$ h bar), 32.0 L/($m^2$ h bar), 268.3 L/($m^2$ h bar), and 260.3 L/($m^2$ h bar), respectively. The anti-fouling curves of the new membrane and the membranes prepared in Examples 1 to 3 are shown in FIG. 3.

The above examples are merely intended to describe the technical solutions of the present invention, rather than to limit the present invention. Although the present invention is described in detail with reference to the above examples, persons of ordinary skill in the art should understand that modifications may be made to the technical solutions described in the above examples or equivalent replacements may be made to some or all technical features thereof, which do not make the essence of corresponding technical solutions depart from the scope of the technical solutions in the examples of the present invention.

In addition, those skilled in the art can understand that, although some examples herein include some features included in other examples but no other features, a combination of features of different examples falls within the scope of the present invention and forms a different example. For example, in the claims, any one of the claimed examples can be used in any combination. The information disclosed in this background section is only intended to deepen the understanding of the general background of the present invention, and should not be regarded as an acknowledgement or any form of suggestion that this information constitutes the prior art common known to those skilled in the art.

What is claimed is:

1. A method for recycling a scrapped polyvinylidene fluoride (PVDF) membrane produced in a water treatment, comprising following steps:
   1) a cleaning of the scrapped PVDF membrane: soaking the scrapped PVDF membrane in 0.2 wt % to 1.0 wt % sodium hypochlorite for 0.5 h to 4 h and then in 0.5 wt % to 4.0 wt % citric acid for 0.5 h to 4 h to remove mud cakes attached to a surface of the scrapped PVDF membrane to obtain a first cleaned scrapped PVDF membrane; and rinsing the first cleaned scrapped PVDF membrane with deionized water to obtain a second cleaned scrapped PVDF membrane for later use;
   2) a structural transformation of the second cleaned scrapped PVDF membrane: soaking the second cleaned scrapped PVDF membrane treated in step 1) in a structural transformation agent at 10° C. to 40° C. for 0.5 min to 4.0 min to obtain a third cleaned scrapped PVDF membrane, wherein, irreversible contaminants are washed away while the second cleaned scrapped PVDF membrane is subjected to a pore expansion and a hydrophilization; and thoroughly rinsing the third cleaned scrapped PVDF membrane with the deionized water to remove superficial residual agents to obtain a fourth cleaned scrapped PVDF membrane; and
   3) a hydrophilicity repairing of the fourth cleaned scrapped PVDF membrane: dissolving dopamine in a 15 mM Tris-HCl buffer aqueous solution to obtain a dopamine solution with a concentration of 0.4 mg/mL to 4 mg/mL, soaking the fourth cleaned scrapped PVDF membrane in the dopamine solution under a heating to obtain a mixture, and shaking the mixture in a shaker to obtain a repaired PVDF membrane, wherein, a polydopamine (PDA) hydrophilic layer is formed through a self-polymerization of the dopamine on a surface of the fourth cleaned scrapped PVDF membrane, the PDA hydrophilic layer further improves hydrophilicity of the surface of the fourth cleaned scrapped PVDF membrane, enhances an anti-contamination performance, and repairs damaged points on the surface of the fourth cleaned scrapped PVDF membrane produced during a long-term operation; and after the self-polymerization is completed, rinsing the repaired PVDF membrane with running deionized water to remove weakly-bound PDA.

2. The method for recycling the scrapped PVDF membrane produced in the water treatment according to claim 1, wherein the scrapped PVDF membrane has a membrane flux lower than 30 L/($m^2$h bar), does not meet requirements of engineering water production, and is hardly to be restored by the cleaning.

3. The method for recycling the scrapped PVDF membrane produced in the water treatment according to claim 2, wherein the scrapped PVDF membrane has been used for 5 to 8 years.

4. The method for recycling the scrapped PVDF membrane produced in the water treatment according to claim 1, wherein the scrapped PVDF membrane is in a form of a flat membrane, a hollow fiber membrane, or a spiral wound membrane.

5. The method for recycling the scrapped PVDF membrane produced in the water treatment according to claim 1, wherein the structural transformation agent in step 2) is a mixed solution of N-methyl pyrrolidone (NMP), dimethylacetamide (DMAC), and methanol prepared in a volume ratio of (10-60):(10-60):30.

6. The method for recycling the scrapped PVDF membrane produced in the water treatment according to claim 1, wherein a repeated use of the structural transformation agent in step 2) is 5 to 8 times.

7. The method for recycling the scrapped PVDF membrane produced in the water treatment according to claim 1, wherein the 15 mM Tris-HCl buffer aqueous solution in step 3) has a pH of 8.8.

8. The method for recycling the scrapped PVDF membrane produced in the water treatment according to claim 1, wherein in step 3), the shaking in the shaker is conducted at a rotational speed of 50 rpm to 150 rpm.

9. The method for recycling the scrapped PVDF membrane produced in the water treatment according to claim 1, wherein in step 3), the fourth cleaned scrapped PVDF membrane is added to the dopamine solution at a heating temperature of 10° ° C. to 40° C.

10. The method for recycling the scrapped PVDF membrane produced in the water treatment according to claim 1, wherein in step 3), the shaking for the hydrophilicity repairing in the shaker is conducted for 2 h to 8 h.

* * * * *